(12) United States Patent
Choi et al.

(10) Patent No.: US 11,470,192 B2
(45) Date of Patent: Oct. 11, 2022

(54) PORTABLE ELECTRONIC DEVICE

(71) Applicant: HMD Global Oy, Espoo (FI)

(72) Inventors: Richard Choi, Sutton (GB); Lee Wen Chuan, Taipei (TW)

(73) Assignee: HMD Global Oy, Espoo (FI)

( * ) Notice: Subject to any disclaimer, the term of this patent is extended or adjusted under 35 U.S.C. 154(b) by 0 days.

(21) Appl. No.: 17/407,305

(22) Filed: Aug. 20, 2021

(65) Prior Publication Data

US 2022/0060573 A1 Feb. 24, 2022

(30) Foreign Application Priority Data

Aug. 21, 2020 (FI) ...................................... 20205817

(51) Int. Cl.
*H04M 1/00* (2006.01)
*H04M 1/02* (2006.01)

(52) U.S. Cl.
CPC ....... *H04M 1/0264* (2013.01); *H04M 1/0237* (2013.01); *H04M 1/0266* (2013.01)

(58) Field of Classification Search
CPC . H04M 1/0237; H04M 1/0264; H04M 1/0266
See application file for complete search history.

(56) References Cited

U.S. PATENT DOCUMENTS

| | | | |
|---|---|---|---|
| 2009/0247247 A1* | 10/2009 | Jang | H04M 1/0237 455/575.4 |
| 2012/0168577 A1 | 7/2012 | Cheng | 248/176.3 |
| 2013/0021427 A1 | 1/2013 | Park et al. | 348/14.02 |
| 2013/0078930 A1 | 3/2013 | Chen et al. | 455/74 |
| 2014/0055978 A1* | 2/2014 | Gantz | H04N 5/232935 362/458 |
| 2017/0366215 A1 | 12/2017 | Scott | |
| 2018/0252355 A1* | 9/2018 | Chen | F16M 13/005 |
| 2019/0014201 A1 | 1/2019 | Bao | |
| 2019/0253537 A1 | 8/2019 | Fan et al. | |
| 2019/0386696 A1 | 12/2019 | Luo et al. | |
| 2022/0053075 A1* | 2/2022 | Ha | H04M 1/0237 |

FOREIGN PATENT DOCUMENTS

| | | |
|---|---|---|
| CN | 109788184 A | 5/2019 |
| KR | 10-2032856 | 10/2019 |

* cited by examiner

*Primary Examiner* — Nhan T Le

(57) ABSTRACT

A portable electronic device includes first and second parts, each having a front face, a back face, two sides, and two ends. A movable attachment attaches said first and second parts to each other with the front face of the second part against the back face of said first part. It allows a relative sliding movement between said first and second parts to a position in which an exposable portion of the front face of the second part along one of said sides of the second part becomes visible from beneath the corresponding side of the first part. A camera in said second part is located in a center region of said exposable portion between the two ends of the second part, with its viewing direction directed out of said front face of the second part.

16 Claims, 5 Drawing Sheets

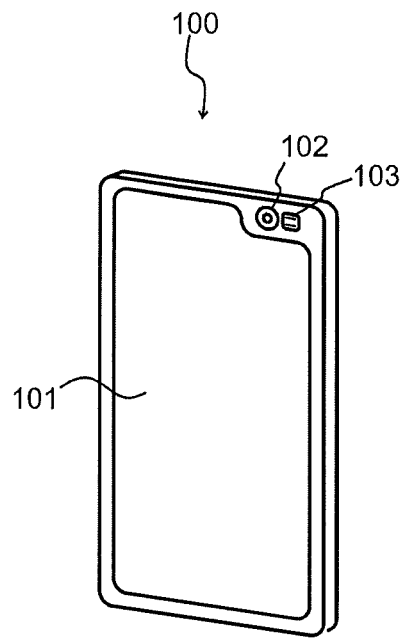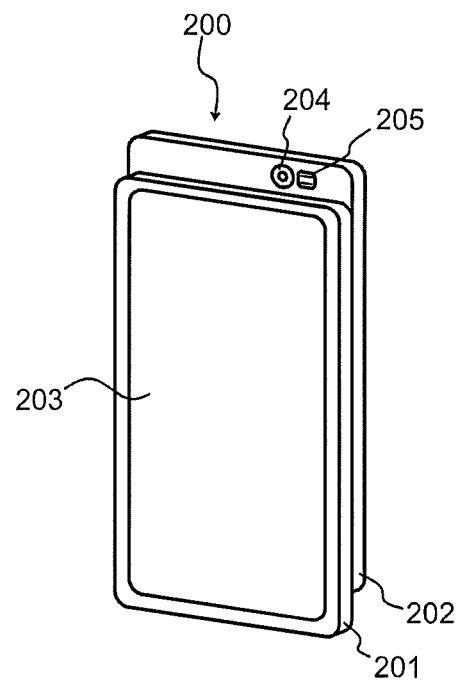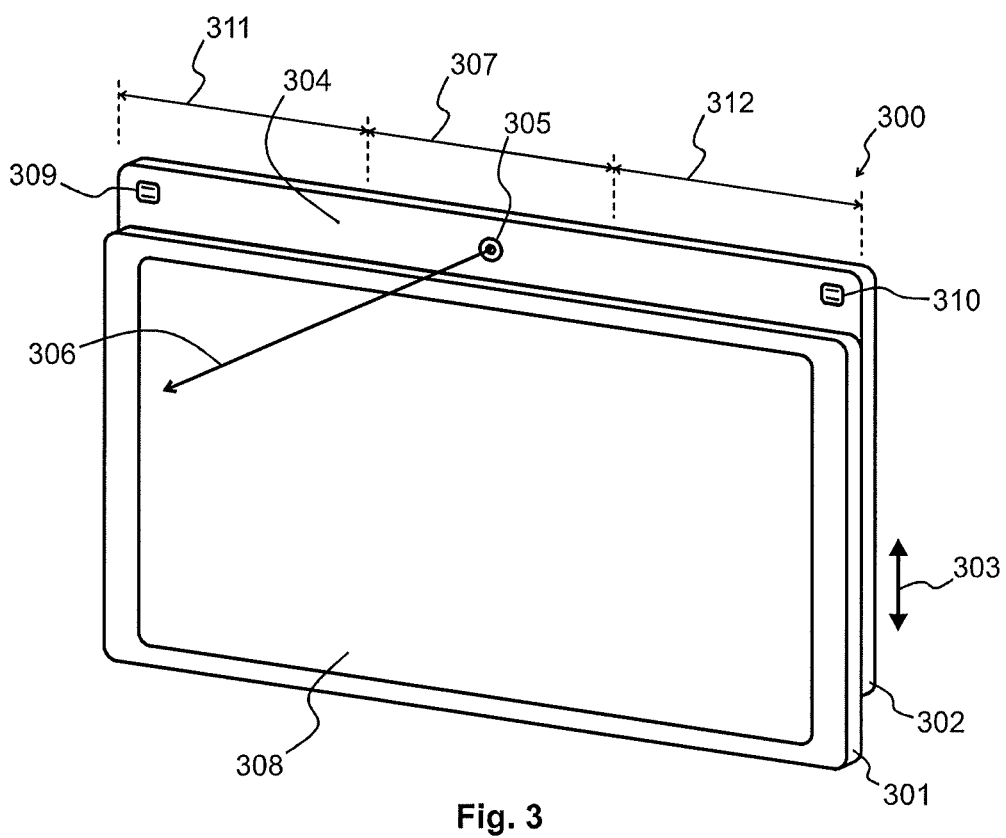

PORTABLE ELECTRONIC DEVICE

TECHNICAL FIELD

The invention relates to the technical field of portable electronic devices that include audiovisual capabilities. In particular the invention relates to the provision and location of hardware components in the portable electronic device for the purpose of optimizing various aspects of the user experience of the electronic device.

BACKGROUND

Portable electronic devices form an integral part of the everyday life of users. An important part of their use is the possibility to create and enjoy audiovisual content, such as still images, videos, and recorded sound. For this purpose, the portable devices may comprise various hardware components, such as cameras, microphones, and speakers, as well as light sources that are used to illuminate objects imaged by the camera(s).

The provision and location of such hardware components has a significant impact on the user experience that users of the portable electronic device may get. A portable electronic device of the kind considered here has typically the general form of a relatively flat rectangular prism, with a touch-sensitive display (or a combination of a display and keypad) covering most of its front surface. One major use of the portable device is as a phone, for which purpose a microphone is typically located close to the bottom end and a loudspeaker close to the top end of the device. Two cameras or camera groups are typically provided, one on the back side and another at the top end of the front side. A major use of the front side camera is that of taking selfies, i.e. photos where the user of the device appears in major role, so that the user may simultaneously use the display to see, how the photo will look like. A semiconductor light source may be provided close to each camera or camera group, on both the front and the back side of the device, for illuminating the photographed object when there is little light otherwise.

The typical location of the hardware components does not enable optimizing the user experience in all kind of use scenarios. One such scenario is the taking of a group selfie or groupie, where a number of other people appear together with the user. Experience has shown that the known ways of placing the hardware components in the device may result in suboptimal objective quality and artistic merit of certain kinds of photos, in particular groupies.

SUMMARY

It is an objective to provide a portable electronic device in which the provision and location of hardware components enable optimizing the use of audiovisual content. Another objective is to enable optimizing the user experience of a portable electronic device in a variety of use scenarios. A further objective is to present a portable electronic device that can be used to take group selfies of high quality.

The foregoing and other advantageous objectives are achieved by the features of the independent claims. Further implementation forms are apparent from the depending claims, the description, and the drawings.

According to a first aspect there is provided a portable electronic device that comprises a first part, said first part having a front face, a back face, two sides, and two ends, and a second part, said second part having a front face, a back face, two sides, and two ends. The portable electronic device may comprise a movable attachment between said first and second parts. The movable attachment may be arranged to attach said first and second parts to each other with the front face of said second part against the back face of said first part. The movable attachment may also be arranged to allow a relative sliding movement between said first and second parts to a position in which an exposable portion of the front face of the second part along one of said sides of the second part becomes visible from beneath the corresponding side of the first part. The portable electronic device may further comprise a camera in said second part, said camera having a viewing direction. Said camera may be located in a center region of said exposable portion between the two ends of the second part, with said viewing direction directed out of said front face of the second part.

According to an embodiment said front face of the second part is equal in size with the back face of the first part. This involves the advantage that the structure of the device is relatively simple to design, with a wide variety of possibilities for designing and placing the movable attachment.

According to an embodiment the portable electronic device comprises at least one light source located in said exposable portion. This involves the advantage that images taken with the camera can be illuminated with light from a source that is similarly located and thus intuitive for the user to use.

According to an embodiment the portable electronic device comprises a first light source and a second light source, of which said first light source is located in said exposable portion adjacent to one of said two ends of the second part and said second light source is located in said exposable portion adjacent to the other of said two ends of the second part. This involves the advantage that light from the light sources can be used in a versatile way to reduce flat appearance of images, red-eye effect, and other disadvantages encountered in prior art solutions.

According to an embodiment the portable electronic device comprises more than two light sources, of which at least two are located in said exposable portion. This involves the advantage of introducing further versatility to the use of light in illuminating the images taken with the camera and possible other cameras.

According to an embodiment at least some of the light sources comprised in the portable electronic device are capable of emitting light of different colour or different colour temperature than others of said light sources. This involves the advantage of introducing further versatility to the use of light in illuminating the images taken with the camera and possible other cameras.

According to an embodiment at least one of said light source or said light sources is arranged to emit light predominantly into a direction that differs from said viewing direction of the camera. This involves the advantage of allowing the use of indirect lighting of imaged spaces and/or objects.

According to an embodiment said camera is a first camera, and the portable electronic device comprises a second camera located adjacent to one of said two ends of the second part, said second camera having a viewing direction. The viewing direction of said second camera may be directed out of the front face of the second part. This involves the advantage that different cameras can be used for different purposes.

According to an embodiment said second camera is located in said exposable portion. This involves the advantages that the second camera is well protected when the exposable portion is not exposed, and that the second camera does not take space from the front face of the front part of the portable electronic device.

According to an embodiment said first camera has a first viewing angle, said second camera has a second viewing angle, and said first viewing angle is wider than said second viewing angle. This involves the advantage that the first camera may be optimized for certain particular purposes, like taking groupies for example.

According to an embodiment the portable electronic device comprises one or more speakers in said second part, with at least some of said one or more speakers located in said exposable portion. This involves the advantage that relatively large speakers of high acoustic quality can be used.

According to an embodiment the portable electronic device comprises a processor configured to control a volume of sound emitted by at least those of said one or more speakers that are located in said exposable portion. The portable electronic device may then comprise a sensor configured to provide said processor with information about said first and second parts being in said position in which said exposable portion of the front face of the second part is visible. Said processor may be configured to respond to said information by increasing the volume of the sound emitted by at least those of said one or more speakers that are located in said exposable portion. This involves the advantage that the user can automatically enjoy louder sound when the device is in the exposed position.

According to an embodiment the portable electronic device comprises a foldable support attached to the back face of the second part for supporting the portable electronic device on a planar surface in a position where the viewing direction of the first camera is at an oblique angle with respect to said planar surface. This involves the advantage of enhanced convenience of use in many situations.

According to an embodiment the portable electronic device comprises a hinge joint between said portable support and said back face of the second part, wherein said hinge joint defines an axis of rotation that is in the plane of the back face of the second part and directed perpendicular to the sides of the second part. This involves the advantage of giving a number of possibilities in placing portable electronic device in various positions on surfaces.

According to an embodiment said foldable support is annular or loop-formed in shape. This involves the advantage that it does not cover very much area on the back face of the second part when folded in.

According to an embodiment the portable electronic device comprises a display that essentially fills the front face of the first part. This involves the advantage of convenient use in consuming and creating audiovisual content.

BRIEF DESCRIPTION OF THE DRAWINGS

The accompanying drawings, which are included to provide a further understanding of the invention and constitute a part of this specification, illustrate advantageous embodiments and together with the description help to explain the principles introduced above. In the drawings:

FIG. 1 illustrates a known portable electronic device,
FIG. 2 illustrates a known portable electronic device,
FIG. 3 illustrates an electronic device according to an embodiment.

DETAILED DESCRIPTION

Figure 4:
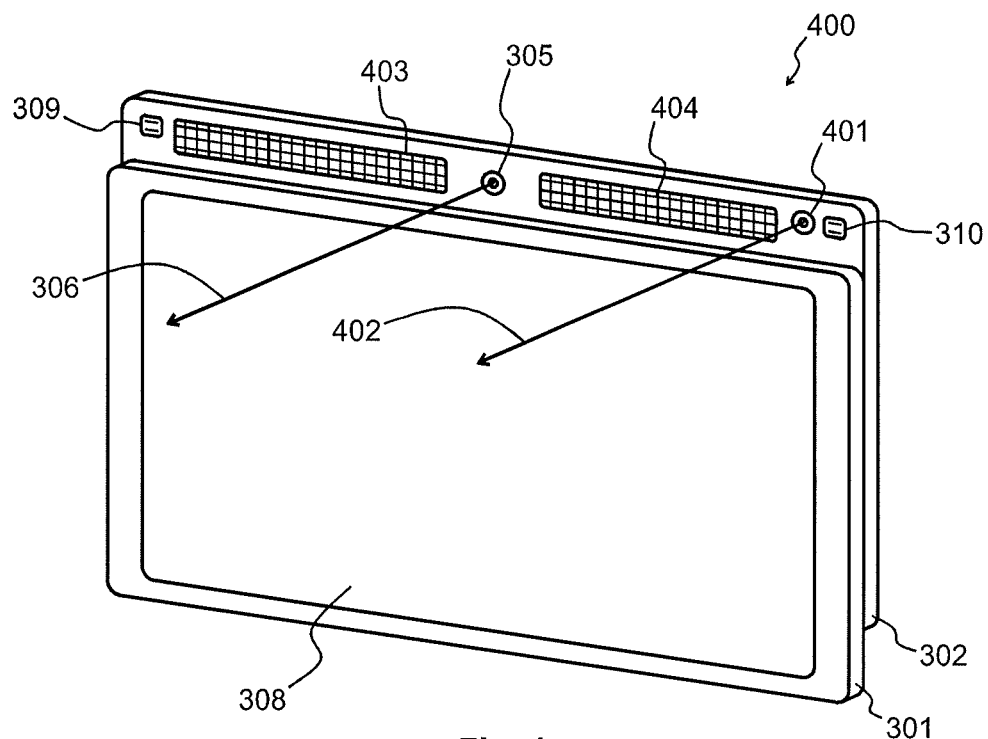
FIG. 4 illustrates an electronic device according to an embodiment.

FIG. 1 illustrates an example of a known portable electronic device 100 that has the general form of a relatively flat rectangular prism: it has a front face, a back face, two sides and two ends. Being relatively flat means that its thickness, i.e. the perpendicular distance between the front and back faces, is much shorter than any of its sides or ends. The length of the sides may be e.g. about twice the length of the ends, the thickness being less than one tenth of the length of the ends. A touch-sensitive display 101 covers most of the front face. A camera 102 and a light source 103 are located on the front face adjacent to one end. Some space must be received for them, which means that either the display must not come very close to that end or—as in FIG. 1—there must be a notch in the display area to accommodate the camera 102 and the light source 103. Users may consider such an arrangement annoying, because it limits the possibility of viewing rectangular visual content like images and video in full.

FIG. 2 illustrates an example of a portable electronic device 200 in which the problem mentioned above is solved. The device comprises a first part 201 and a second part 202, both of which have the similar general form of a relatively flat rectangular prism. A touch-sensitive display 203 fills essentially the whole front face of the first part 201. A sliding joint mechanism (not separately shown) attaches the parts 201 and 202 to each other, so that the second part 202 can be slid upwards to expose a portion that houses the camera 204 and the light source 205 adjacent to one end of the second part 202.

It has been found, however, that an arrangement like that in FIG. 2 is not optimal for certain use cases, like taking a group selfie or groupie. Namely, while an individual user taking a selfie typically holds the portable electronic device upright, as in FIG. 2, taking a groupie is often more convenient if the device is turned sideways, i.e. horizontal. The persons to be included in the groupie may stand next to each other, side by side, so that the most natural image orientation for the groupie is the landscape orientation. The portable electronic device 200 typically includes attitude sensors that inform a processor of the device about the detected sideways orientation, so that the processor may respond by rotating the essential visual information displayed on the display 203 appropriately. However, since the camera 204 is then at one horizontal extremity of the device while people tend to look at about the middle point of the display 203, the groupie taken may show the persons looking slightly to one side. Other disadvantages that have been found in arrangements like that of FIG. 2 include, but are not limited to, somewhat flat appearance of the image as well as people having red eyes. Both of these may be attributed to the camera 204 and the light source 205 being quite close to each other.

FIG. 3 shows a portable electronic device 300 that comprises a first part 301 and a second part 302. The first part 301 has a front face, which is seen in FIG. 3, and a back face which is parallel to the front face. The first part 301 has two sides, which appear horizontal in the axonometric view of FIG. 3, and two ends that appear vertical. The second part 302 is quite similarly formed so that it too has a front face, a back face, two sides, and two ends. The front face of the second part 302 is equal in size with the back face of the first part 301. The first part 301 and the second part 302 match each other so well in shape and size that if they are accurately against each other (the back face of the first part 301 against the front face of the second part 302) the portable electronic device 300 appears to have the general form of a simple, relatively flat rectangular prism, the thickness of which is the combined thickness of the first and second parts 301 and 302.

The portable electronic device 300 comprises a movable attachment between the first and second parts 301 and 302. The movable attachment is arranged to attach the first and second parts 301 and 302 to each other with the front face of the second part 302 against the back face of the first part 301. The movable attachment is also arranged to allow a relative sliding movement between the first and second parts 301 and 302 in the direction of the arrow 303. At one end of the relative sliding movement the first and second parts 301 and 302 are in the position shown in FIG. 3, in which an exposable portion 304 of the front face of the second part 302 becomes visible. This may be called the exposed position for short.

The exposable portion 304 is located along one side (in FIG. 3: the top side) of the second part 302; in this embodiment it constitutes a strip of uniform breadth extending along said side of the second part 302 for the full length of the portable electronic device from one end to the other. In the exposed position it becomes visible from beneath the corresponding side of the first part 301.

The movable attachment between the first part 301 and the second part 302 can take any form, like pairs of mutually engaging ridges and grooves for example. A large variety of portable electronic devices with mutually sliding parts are known also from prior art, and any mechanism used in their movable attachments can be used. For the purposes of the present description it is not important how the movable attachment is implemented in practice, as long as it results in the possibility of slidably moving the first and second parts in relation to each other as described here.

The portable electronic device 300 comprises a camera 305 in the second part 302. The camera has a viewing direction, which is shown with an arrow 306. The viewing direction means the direction into which the camera 305 "looks", i.e. the direction where a center point of an image taken by the camera 305 would be located.

The camera 305 is located in a center region of the exposable portion 304. For the purposes of this description the center region is defined so that if one divides the length of the exposable portion 304 between the two ends of the second part 302 in three equal sections, the center region is the middle one of these sections as shown with the arrow 307. The viewing direction 306 of the camera 305 is directed out of the front face of the second part 302. In the embodiment of FIG. 3 it is directed perpendicularly out thereof, but this is not a mandatory requirement. The viewing direction 306 of the camera 305 may be directed obliquely out of the front face of the second part 302.

In the embodiment of FIG. 3 the portable electronic device 300 comprises a display 308 that essentially fills the front face of the first part 301. The viewing direction 306 of the camera 305 is most advantageously parallel to the direction from which the display 308 is viewed best.

Placing the camera 305 this way involves many advantages. The distance from the center point of the display 308 to the camera 305 is relatively short, so in an image taken by the camera 305 a person looking at the display 308 appears almost as looking directly to the camera. This is particularly advantageous in taking groupies with the portable electronic device in the position shown in FIG. 3, because a number of people standing or sitting side by side fit all neatly into the image and appear all as looking (almost) directly at the camera. Placing the camera 305 in the exposable portion of the second part 302 involves also the advantage that it remains well protected whenever the portable electronic device is in the non-exposed, closed position.

Further advantages become apparent if the portable electronic device also comprises at least one light source. In the embodiment of FIG. 3 the portable electronic device comprises two light sources 309 and 310. These may be for example semiconductor light sources such as LEDs (light emitting diodes) capable of emitting white light. The light sources 309 and 310 are located in the exposable portion 304 of the second part 302. In particular, the first light source 309 is located in the exposable portion 304 adjacent to one of the two ends of the second part 302. The second light source 310 is located in the exposable portion 304 adjacent to the other end of the second part 302. More generally, it may be said that—taken the division into three sections described above—the first light source 309 is located in one end section 311 and the second light source 310 is located in the other end section 312.

When the whole length of the side of the second part 302 is available for placing the light sources 309 and 310, they may be placed relatively far away from the camera 305. This may help to reduce the flat appearance of photos taken, as well as the red-eye effect of the persons photographed. Appropriate timing may help further, for example so that during the exposure period of the camera first one light source is flashed and then the other, or they are flashed in some other kind of sequence.

The relatively large space that is available in the exposable portion 304 may be utilized to place also further components in there. FIG. 4 illustrates a portable electronic device 400 in which the camera 305 may be called a "first" camera. The portable electronic device 400 comprises a second camera 401, which is located adjacent to one end of the second part 302. The second camera 401 has a viewing direction 402, which is directed out of the front face of the second part 302. In the embodiment of FIG. 4 the viewing direction 402 of the second camera 401 is parallel to the viewing direction 306 of the first camera 305 and both are directed perpendicularly out of the front face of the second part 302, but these are not mandatory requirements. The viewing directions 306 and 402 may be other than parallel, and any or both of them may be directed obliquely out of the front face of the second part 302.

The space available in the exposable portion may also be utilized for one or more speakers. In the embodiment of FIG. 4 the portable electronic device 400 comprises two speakers 403 and 404 located in the exposable portion. Naturally the portable electronic device may comprise also other speakers, located elsewhere than in the exposable portion. A significant advantage of placing one or more speakers in the exposable portion is the relatively large area that can be used to actually emit sound, which may enable achieving better acoustic impedance matching to the surrounding air than if only very small speaker area was available. In short, larger speakers may enable better sound quality. A natural orientation of using the portable electronic device 400 is the horizontal one shown in FIG. 4, in which also the orientation of the display 308 matches that typically used in combined audiovisual content such as videos or games. The user may like to enjoy the sound of higher quality when consuming such combined audiovisual content, even if a smaller and differently located other speaker was in use in other cases such as telephone calls.

Figure 5:
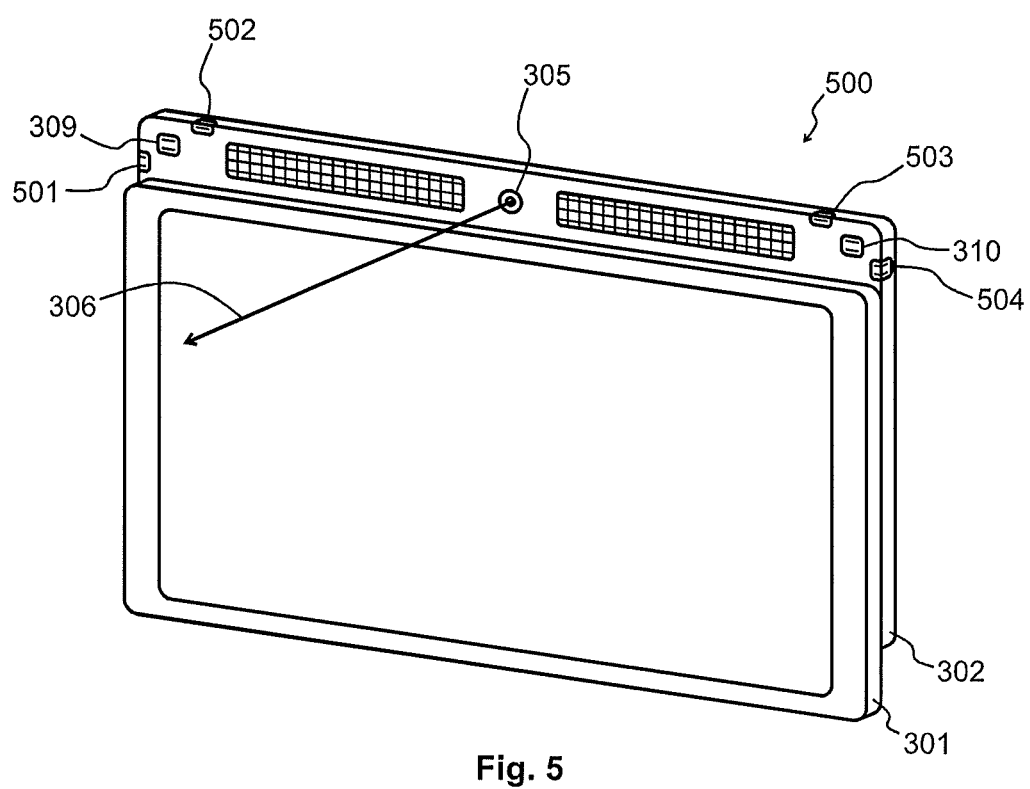
FIG. 5 illustrates an electronic device according to an embodiment.

The space available in the exposable portion may also be utilized for more than two light sources. FIG. 5 illustrates a portable electronic device 500 that comprises, in addition to the light sources 309 and 310 described above, additional light sources 501, 502, 503, and 504. It may be advantageous to place at least two of the light sources in the exposable portion, like light sources 309 and 310 here. In the example embodiment of FIG. 5 the further light sources 501, 502, 503, and 504 are located partly in the exposable portion, namely at its very edges, so that they are capable of emitting light also to other directions than those directed out of the front face of the second part 302.

In general, at least one of the light source(s) comprised in the portable electronic device may be arranged to emit light predominantly into a direction that differs from the viewing direction 306 of the (first) camera 305. Alternatively or additionally, at least some of the light sources comprised in the portable electronic device may be capable of emitting light of different colour or different colour temperature than other light sources. Both these possibilities may enable achieving further versatility in the way in which photographed objects and/or spaces are lit for imaging. For example, at least one light source may be used to illuminate the photographed object or space indirectly, like with light that reflects from a wall or a ceiling.

Any of the light source(s) of the portable electronic device may comprise means for selectably emitting light of changing colours in response to one or more control signals from one or more colour controllers in the device. A colour-changing light source of this kind can be made for example by combining (or otherwise jointly controlling) two or more LED chips or other constituent light sources of different colour, so that the colour of the emitted light can be changed by changing the intensity at which each constituent light source is made to emit light.

As an addition to or an alternative for individual light sources, the portable electronic device may comprise one or more light source matrices, such as LED matrices for example. LED matrices can also be called LED arrays, and they comprise a multitude of individually controllable LEDs or LED chips. In a so-called multiple flashlight design the portable electronic device may comprise multiple lights in multiple positions, the light emitted by such multiple lights having the capability to cover different sub-areas of the imaged area. By controlling such multiple lights appropriately the arrangement can make sure that e.g. the whole group of people that is to be photographed is properly illuminated.

Figure 16:
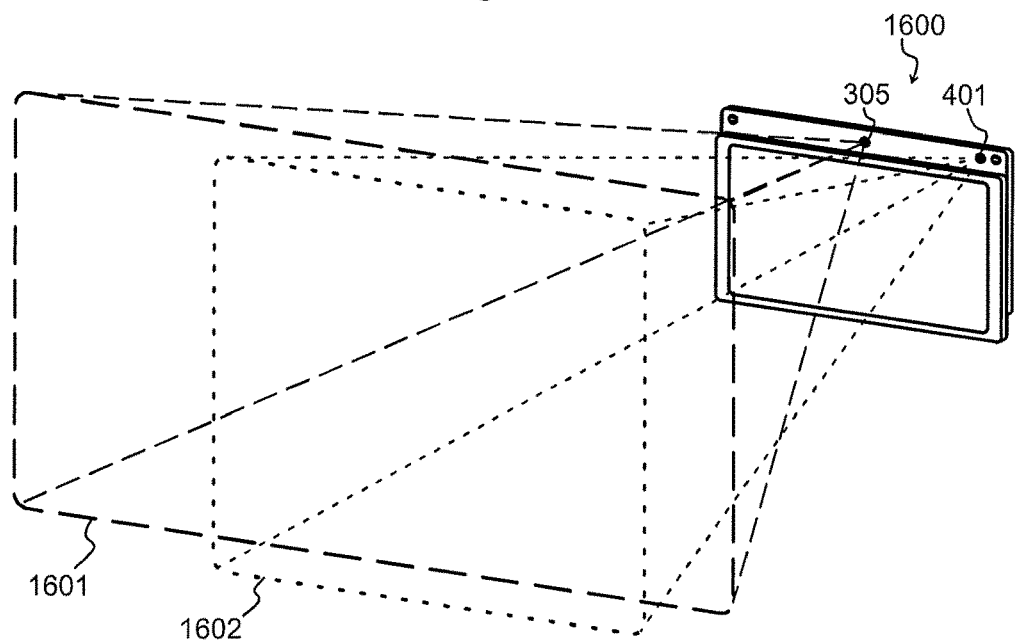
FIG. 16 illustrates an electronic device according to an embodiment.

Reference is briefly made to FIG. 16 in order to discuss the subject of viewing angles. Each camera can be said to have a viewing angle, which is the angle between the lines from the camera to the points furthest away from each other that fit in the same image. The viewing angle may be considered in a certain plane, for example in a horizontal plane or vertical plane when the has a default orientation for imaging. The designer of a camera may select a desired viewing angle by designing the optics and other characteristics of the camera appropriately, which is a technique well known in the technical field of camera design. In those embodiments where the portable electronic device comprises first and second cameras, it may be advantageous to make the cameras have different viewing angles.

FIG. 16 illustrates a portable electronic device 1600 which comprises a first camera 305 and a second camera 401, located in the exposable portion in a way similar to that described above with reference to FIG. 4. The viewing angles of the two cameras are illustrated in dashed lines. The first camera 305 has a first viewing angle, illustrated with the rectangle 1601, and the second camera 401 has a second viewing angle, illustrated with the rectangle 1602. The first viewing angle is wider than the second viewing angle. In particular, the first viewing angle is wider than the second viewing angle in the plane that is horizontal with reference to using the portable electronic device 1600 in the way shown in FIG. 16.

This way of selecting the viewing angles may help to further optimize the use of the portable electronic device for certain use cases, like taking groupies. As already described above, a group of people wishing to appear in a groupie typically place themselves side by side next to each other, so that the set-up to be imaged has the proportions of a typical landscape painting. A viewing angle of the first camera 305 that is wide in the way shown in FIG. 16 may easily accommodate such a set-up. The width of the viewing angle of the first camera may be for example in the order of 120 degrees. On the other hand, if the second camera 401 is mainly used for selfies taken of one person only, possibly with the portable electronic device in a vertical orientation, the narrower viewing angle illustrated by rectangle 1602 may be better in that case. The width of the narrower viewing angle may be for example in the order of 80 or 90 degrees. It is also possible to use controllable optics to allow the user to affect the viewing angle of any or both of the cameras according to need.

Figure 6:
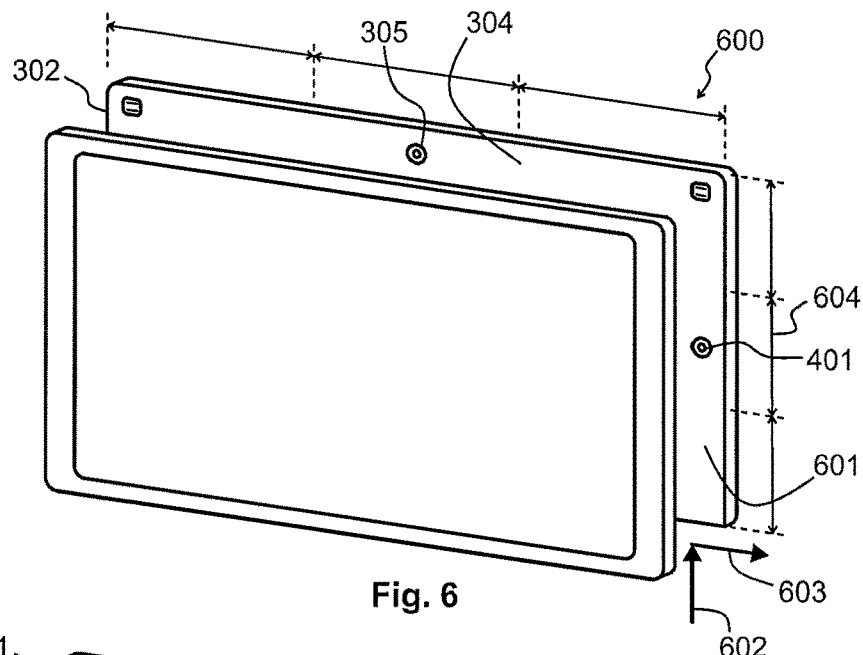
FIG. 6 illustrates an electronic device according to an embodiment.

The slidable movement of the second part in relation to the first part does not need to be directly out of one side. FIG. 6 illustrates a portable electronic device 600 in which the second part 302 can be moved into an exposed position that reveals a first exposable portion 304 along one side of its front face and a second exposable portion 601 along one end of its front face. The slidable movement may be considered to have consisted of a transverse movement, illustrated by arrow 602, and a longitudinal movement, illustrated by arrow 603.

There are many possibilities: for example, the movable attachment between the first and second parts 301 and 302 may be such that it allows the user to make either the transverse movement, revealing only the first exposable portion 304, or the longitudinal movement, revealing only the second exposable portion 601. Alternatively, the movable attachment may be such that it allows the user to make any of these or even both, revealing both the first and second exposable portions 304 and 601. As a yet further alternative, the movable attachment may be such that it actually allows only one slidable movement, which is directed obliquely out of one corner of the portable electronic device so that the first and second exposable portions 304 and 601 always become visible simultaneously.

In the embodiment of FIG. 6 the second camera 401 is located in a center region of the second exposable portion 601 between the two sides of the second part, as illustrated by arrow 604. This enables achieving similar advantages that come from the location of the first camera 305 in the central region of the first exposable portion 304. Namely, a user taking a selfie with the portable electronic device in a vertical position may naturally look at the center of the display portion or even its upper part, which is very close to the location of the second camera 401 in that case.

Figure 7:
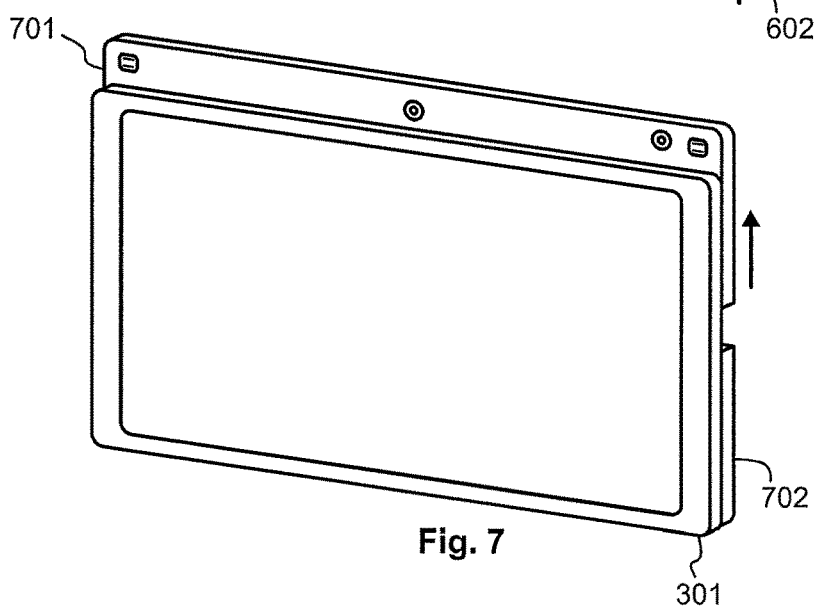
FIG. 7 illustrates an electronic device according to an embodiment.

The second part does not need to be equal in size with the first part. FIG. 7 illustrates an embodiment in which the second part 701 has the size of approximately one half of the first part, the dividing line being oriented parallel to the sides. The part 702 of the portable electronic device, which appears as a stationary second half of the second part in FIG. 7, may be slidably attached to the first par 301 independently, for example allowing it to be slid out of the opposite side of the first part 301. It may even be integral with the first part, allowing components that require more space in the thickness direction of the device to be placed there.

Figure 8:
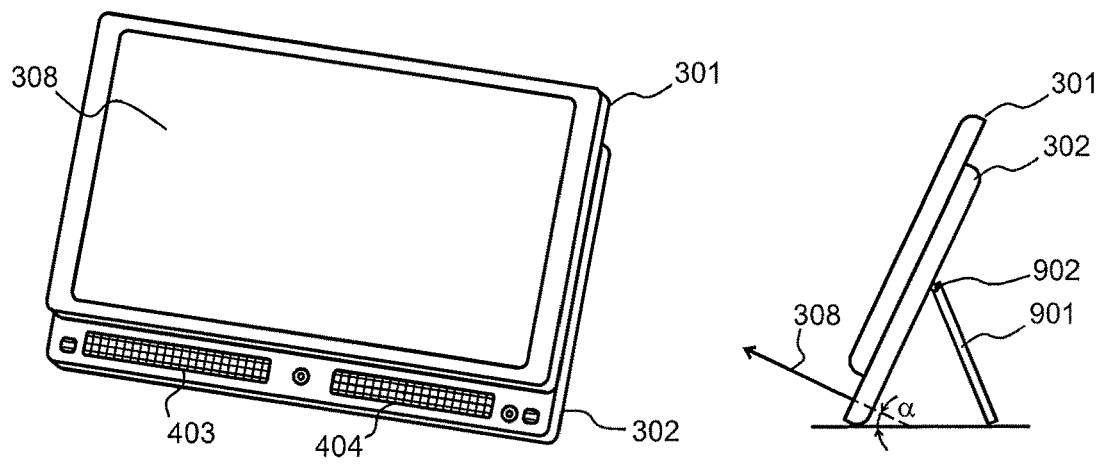
FIG. 8 illustrates an example of using an electronic device according to an embodiment.

The position in which the exposed portion appears at the top of the horizontally oriented device is not the only possible way of using the portable electronic device. FIG. 8 illustrates a case in which the portable electronic device is used with the exposed portion at the bottom. From the technology of portable electronic devices it is well known to configure the image-processing circuitry of the device so that it always presents visual information in the correct orientation in the display 308. Users may like to experiment with the different orientations: for example, some users prefer their selfies or groupies to be taken from a direction slightly below horizontal, for which purpose the position shown in FIG. 8 might be better.

Another reason for using the portable electronic device in the position shown in FIG. 8 may be the possibility of using an adjacent surface for further enhancement of the quality of emitted sound. Together with the structure of the speakers 403 and 404 (and possibly the surrounding structure of the second part 302), such an adjacent surface may form a sound reflector that directs the emitted sound better towards any possible user(s). Additionally or alternatively, the structure of the speakers 403 and 404 and/or their location close to the side of the second part 302 may be such that they may convey some of the generated vibrations on acoustic frequencies into an adjacent hard surface, such as the top of a table for example. In other words, the arrangement may harness the adjacent hard surface to work as an external vibrator of the created sound reproduction system, which may significantly enhance the quality of the reproduced sound in the ears of a nearby user.

Figure 9:
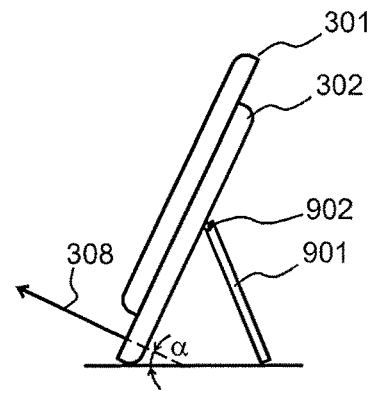
FIG. 9 illustrates an example of using a foldable support.

FIG. 9 shows an exemplary use case in which the portable electronic table is supported on a flat surface such as a table. This is particularly easy if the portable electronic device comprises a foldable support 901 attached to the back face of the second part 302. The foldable support 901 can be used for supporting the portable electronic device on a planar surface in a position where the viewing direction 308 of the first camera is at an oblique angle (marked with the Greek letter alpha in FIG. 9) with respect to said planar surface.

The portable electronic device may comprise a hinge joint between the portable support 901 and the back face of the second part 302, which hinge joint defines an axis of rotation. In the embodiment of FIG. 9 the axis of rotation defined by the hinge joint 902 is essentially in the plane of the back face of the second part and directed parallel to the sides of the second part. In other words, the axis of rotation is essentially horizontal, when the portable electronic device is in the position shown in FIGS. 8 and 9.

Figure 10:
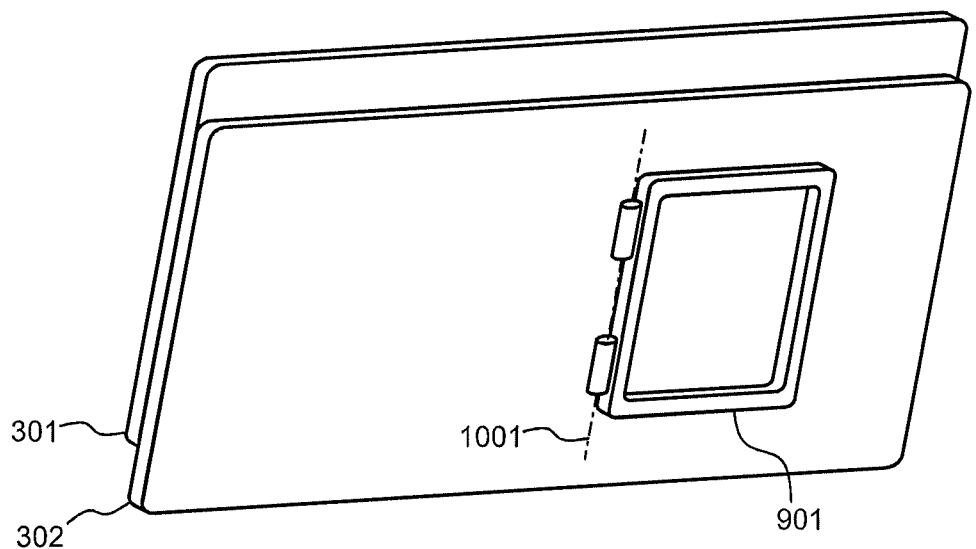
FIG. 10 illustrates an electronic device according to an embodiment.
Figure 11:
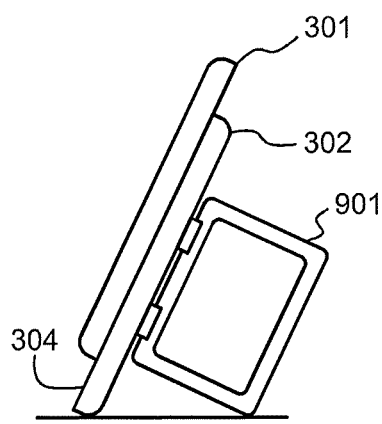
FIG. 11 illustrates an example of using a foldable support.
Figure 12:
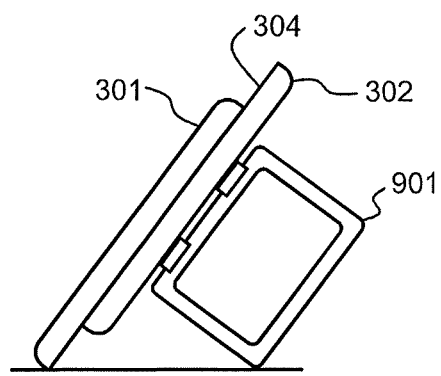
FIG. 12 illustrates an example of using a foldable support.

FIG. 10 shows an alternative embodiment, in which the axis of rotation 1001 defined by the hinge joint is also essentially in the plane of the back of the second part 302 but directed perpendicular to the sides of the second part 302. An important advantage gained therethrough is the possibility of using the same foldable support regardless of which of the sides is up and which down in the position where the portable electronic device is supported on a planar surface. This is shown in FIGS. 11 and 12. FIG. 11 illustrates the portable electronic device supported on a planar surface with that side down where the exposable portion 304 appears, while in FIG. 12 said side is up.

Figure 13:
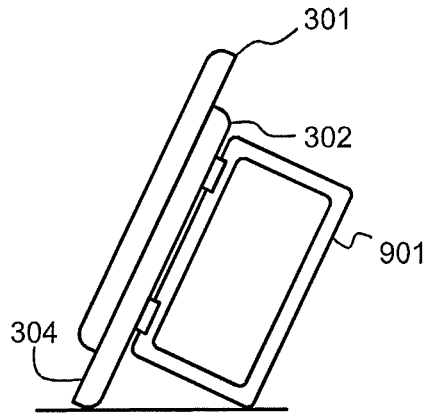
FIG. 13 illustrates an example of using a foldable support.
Figure 14:
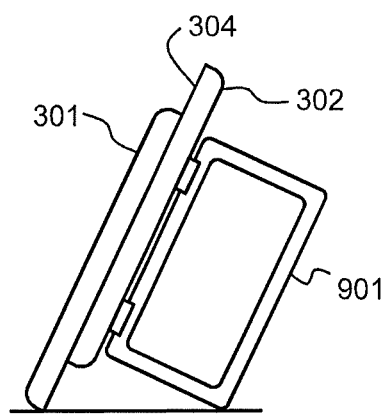
FIG. 14 illustrates an example of using a foldable support.

In FIGS. 10 to 12 the foldable support 901 and its hinged joint attachment to the second part 302 are symmetric in the direction perpendicular to the sides of the second part 302. This results in the different angle formed between the portable electronic device and the planar surface depending on which side is up and which is down. By making the foldable support 901 and its hinged joint attachment to the second part 302 non-symmetric in said direction it is possible to affect said angle, and even make said angle independent of which side is up and which is down, as shown in FIGS. 13 and 14.

Figure 15:
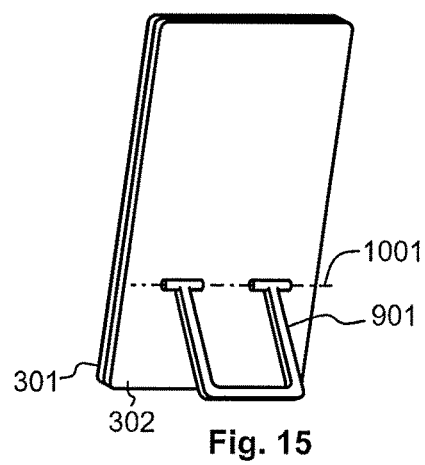
FIG. 15 illustrates an example of using a foldable support.

If the dimensioning of the foldable support 901 and the location of its hinged joint attachment to the back face of the second part are suitable, the same foldable support 901 can even be used to support the portable electronic device on a planar surface in an upright position, i.e. standing on one of its ends. This is shown in FIG. 15.

In the embodiments of FIGS. 10 to 15 the foldable support 901 is annular or loop-formed in shape. In particular, in FIGS. 10 to 14 it has the shape of a square annulus with somewhat rounded corners while in FIG. 15 it has the form of a square U-shaped loop. Annular and loop-formed shapes are advantageous, because when the foldable support 901 is in its stowed position, i.e. folded against the back face of the second part, they leave a large area open in their middle. This open area can be used to place other components of the portable electronic device that must be accessible from outside, like a back-side camera or camera group and its possible light sources. Although relatively rectangular shapes have been shown in the drawings, the annular or loop-formed shape may have any suitable outline, like a circular loop for example.

Figure 17:
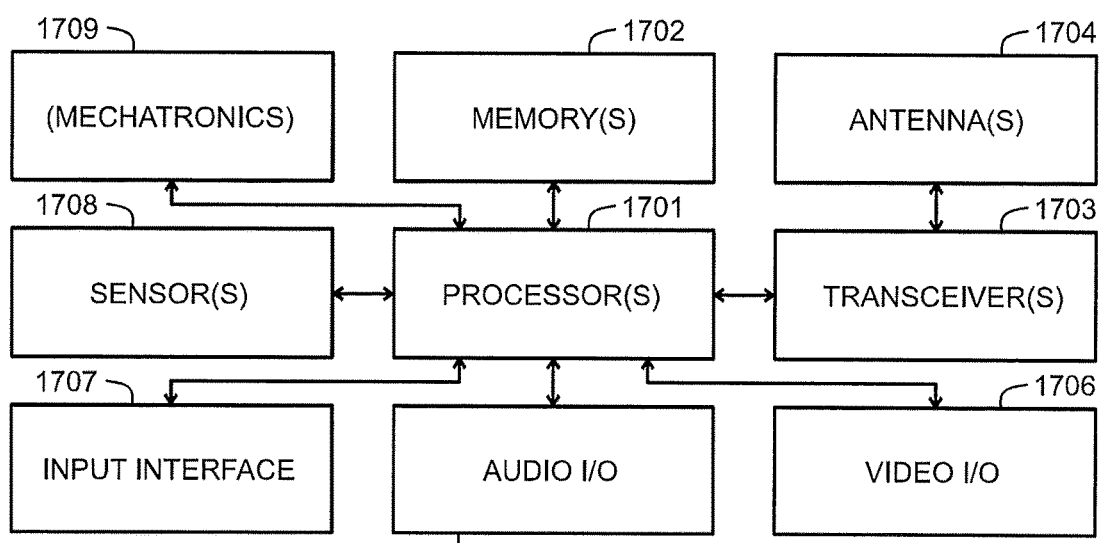
FIG. 17 illustrates a block diagram of an electronic device according to an embodiment.

FIG. 17 is a block diagram of a portable electronic device according to an embodiment. A central part of the device is constituted by one or more processors 1701, which execute program code stored in one or more memories 1702 and use said one or more memories for storing data and for retrieving stored data. For wireless communications with other devices the processor(s) 1701 may be coupled to one or more transceivers 1703, such as cellular, Wi-Fi-, Bluetooth-, NFC- and/or other transceiver(s), equipped with the corresponding appropriate antenna(s) 1704. The audio input and output block 1705 may comprise microphone(s), speaker(s), and audio processing circuitry that may be necessary for linking such components with the processor(s) 1701. The video input and output block 1706 may comprise camera(s), display(s) and video processing circuitry that may be necessary for linking such components with the processor(s) 1701. The input interface block 1707 may comprise means for the user to give inputs to the device, such as a touch screen, keys, and/or the like. The sensor(s) block 1708 may comprise sensors that provide the processor(s) 1701 with information about detected quantities such as orientation, amount of ambient light, position of the parts of the device with respect to each other, and/or the like. As yet another possible block there is shown a mechatronics block 1709 that may comprise processor-controlled mechanisms for various purposes, like actuators that can move some parts of the device with respect to each other.

The blocks of the portable electronic device shown in FIG. 17 may be used to implement those functionalities of the device described above and many more. For example, a processor in the processor(s) block 1701 may be configured to control a volume of sound emitted by at least those of the speakers of the device that are located in the exposable portion and that appear in the audio input and output block 1705 in the block diagram of FIG. 17. The sensor(s) block 1708 may comprise a sensor configured to provide such a processor with information about the first and second parts being in the exposed position. A piece of program code stored in the memory 1702 and executed by one or more processors in the processor(s) block 1701 may make the processor respond to such information by increasing the volume of the sound emitted by at least those speakers that are located in said exposable portion.

The exemplary embodiments described above can be varied in many ways. As an example, the slidable movement between the first and second parts does not need to be linear, although linear slidable movements are often mechanically easy to implement. In an alternative embodiment the slidable movement may be a rotating one, much like the rotating movement that a player of cards uses to spread the cards in their hand into a fan. In that case the exposable portion on the front face of the second part may have a sector-like form.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A portable electronic device, comprising:
a first part, said first part having a front face, a back face, two sides, and two ends;
a second part, said second part having a front face, a back face, two sides, and two ends;
a movable attachment between said first and second parts;
a display on the front face of the first part; and
a camera in said second part, said camera having a viewing direction;
wherein the movable attachment is arranged to attach said first and second parts to each other with the front face of said second part against the back face of said first part; and
wherein the movable attachment is arranged to allow a relative sliding movement between said first and second parts to a position in which an exposable portion of the front face of the second part along one of said sides of the second part becomes visible from beneath the corresponding side of the first part; and
wherein said camera is located in a center region of said exposable portion between the two ends of the second part, with said viewing direction directed out of said front face of the second part, with a relatively short distance from the center point of the display to the camera, the relatively short distance comprising a distance from a midpoint of a longer side of the two sides on the second part to the center point.

2. The portable electronic device according to claim 1, wherein said front face of the second part is equal in size with the back face of the first part.

3. The portable electronic device according to claim 1, comprising at least one light source located in said exposable portion.

4. The portable electronic device according to claim 3, comprising a first light source and a second light source, of which said first light source is located in said exposable portion adjacent to one of said two ends of the second part and said second light source is located in said exposable portion adjacent to the other of said two ends of the second part.

5. The portable electronic device according to claim 3, wherein the portable electronic device comprises more than two light sources, of which at least two are located in said exposable portion.

6. The portable electronic device according to claim 5, wherein at least some of the light sources comprised in the portable electronic device are capable of emitting light of different colour or different colour temperature than others of said light sources.

7. The portable electronic device according to claim 3, wherein at least one of said light source or said light sources is arranged to emit light predominantly into a direction that differs from said viewing direction of the camera.

8. The portable electronic device according to claim 1, wherein said camera is a first camera, the portable electronic device comprises a second camera located adjacent to one of said two ends of the second part, said second camera having a viewing direction, and wherein the viewing direction of said second camera is directed out of the front face of the second part.

9. The portable electronic device according to claim 8, wherein said second camera is located in said exposable portion.

10. The portable electronic device according to claim 8, wherein said first camera has a first viewing angle, said second camera has a second viewing angle, and said first viewing angle is wider than said second viewing angle.

11. The portable electronic device according to claim 1, comprising one or more speakers in said second part, with at least some of said one or more speakers located in said exposable portion.

12. The portable electronic device according to claim 11, comprising: a processor configured to control a volume of sound emitted by at least those of said one or more speakers that are located in said exposable portion, and a sensor configured to provide said processor with information about said first and second parts being in said position in which said exposable portion of the front face of the second part is visible;
wherein said processor is configured to respond to said information by increasing the volume of the sound emitted by at least those of said one or more speakers that are located in said exposable portion.

13. The portable electronic device according to claim 1, comprising a foldable support attached to the back face of the second part for supporting the portable electronic device on a planar surface in a position where the viewing direction of the first camera is at an oblique angle with respect to said planar surface.

14. The portable electronic device according to claim 13, comprising a hinge joint between said foldable support and said back face of the second part, wherein said hinge joint defines an axis of rotation that is in the plane of the back face of the second part and directed perpendicular to the sides of the second part.

15. The portable electronic device according to claim 13, wherein said foldable support is annular or loop-formed in shape.

16. The portable electronic device according to claim 1, wherein said display essentially fills the front face of the first part.

* * * * *